(12) United States Patent
Zanichelli

(10) Patent No.: US 8,747,497 B2
(45) Date of Patent: Jun. 10, 2014

(54) CATALYTIC SECONDARY REFORMING PROCESS AND REACTOR FOR SAID PROCESS

(75) Inventor: Luca Zanichelli, Grandola ed Uniti (IT)

(73) Assignee: Casale Chemicals SA (CH)

( * ) Notice: Subject to any disclaimer, the term of this patent is extended or adjusted under 35 U.S.C. 154(b) by 0 days.

(21) Appl. No.: 12/781,322

(22) Filed: May 17, 2010

(65) Prior Publication Data

US 2010/0221157 A1 Sep. 2, 2010

Related U.S. Application Data

(62) Division of application No. 10/595,717, filed as application No. PCT/EP2004/011949 on Oct. 22, 2004.

(30) Foreign Application Priority Data

Nov. 6, 2003 (EP) .................................... 03025524

(51) Int. Cl.
*B01J 8/00* (2006.01)
(52) U.S. Cl.
USPC .............................................. 48/61; 422/625
(58) Field of Classification Search
USPC ........................................ 48/61–62 A, 127.9
See application file for complete search history.

(56) References Cited

U.S. PATENT DOCUMENTS

| 4,245,980 A * | 1/1981 | Reed et al. ..................... 431/182 |
| 6,201,029 B1 * | 3/2001 | Waycuilis ..................... 518/703 |
| 7,048,772 B1 * | 5/2006 | Bedetti ........................ 48/198.8 |
| 2003/0188486 A1 * | 10/2003 | Tanaka et al. ................ 48/189.6 |
| 2004/0047777 A1 | 3/2004 | Pettit et al. |

FOREIGN PATENT DOCUMENTS

| EP | 1359119 A1 | 11/2003 |
| GB | 2305186 A | 4/1997 |
| SU | 259054 A | 12/1969 |
| WO | 00/47517 A | 8/2000 |

* cited by examiner

*Primary Examiner* — Imran Akram
(74) *Attorney, Agent, or Firm* — Akerman LLP

(57) ABSTRACT

A catalytic secondary reforming process, for the production of synthesis gas, comprises the successive steps of: feeding a first gas flow comprising hydrocarbons and a second gas flow comprising oxygen into a reforming reactor, at least one of such gas flows being fed into the reactor in a predetermined feed direction substantially parallel, preferably coaxial, to a longitudinal axis of the reactor, mixing the gas flows in the reactor, with substantially simultaneous oxidation of the hydrocarbons of the first gas flow by the oxygen of the second flow.

7 Claims, 3 Drawing Sheets

CATALYTIC SECONDARY REFORMING PROCESS AND REACTOR FOR SAID PROCESS

CROSS-REFERENCE TO RELATED APPLICATIONS

This application is a divisional of U.S. patent application Ser. No. 10/595,717, filed May 5, 2006, which is a §371 National Phase of PCT/EP2004/011949, filed Oct. 22, 2004, the entirety of which is incorporated herein by reference.

FIELD OF APPLICATION

The present invention refers, in its most general aspect, to a catalytic secondary reforming process, for the production of synthesis gas, of the type comprising the successive steps of:

feeding a first gas flow comprising hydrocarbons and a second gas flow comprising oxygen into a reforming reactor, at least one of said gas flows being fed into said reactor in a predetermined feed direction substantially parallel, preferably coaxial, to a longitudinal axis of said reactor, mixing said gas flows in said reactor, with substantially simultaneous oxidation of the hydrocarbons of said first gas flow by the oxygen of said second gas flow.

In the rest of the description and in the subsequent claims, with the term "hydrocarbons" we generically mean to identify a hydrocarbon or mixtures of hydrocarbons that are saturated and/or unsaturated, light and/or heavy (for example C1-C6); with "gas flow comprising hydrocarbons" we mean to identify preferably a flow of gas coming from a primary reforming process of predetermined hydrocarbons (partially reformed gases), containing hydrogen, carbon monoxide, carbon dioxide, steam and unreacted hydrocarbons.

With the term "gas flow comprising oxygen", on the other hand, we generally mean to identify a gas flow which consists of pure oxygen, air, oxygen-enriched air or air comprising oxygen, nitrogen and steam in predetermined proportions.

With the term "synthesis gas", we generally mean to identify a mixture of gases used to produce methanol or ammonia, or else in general a gas comprising hydrogen, carbon monoxide and possibly nitrogen.

PRIOR ART

It is known that a catalytic secondary reforming process intended for the production of synthesis gas takes place schematically in two successive steps: a first partial oxidation step of predetermined hydrocarbons and a second step of completing the oxidation of the hydrocarbons that did not react in the first step, carried out in an appropriate catalytic bed.

It is known that to obtain a high yield in this second step, in other words to obtain an optimal completion of the oxidation of the hydrocarbons, it is necessary for the temperature and composition at the entry of the catalytic bed to be as uniform as possible, so that the catalyst can work, in every point of the catalytic bed, in conditions as close as possible to the predetermined ones from the design stage.

As regards to secondary reforming processes of the prior art, it has constantly been noted at the entry of the catalytic bed that there is substantial non-uniformity of temperature distribution, quantifiable in $\Delta T$, between two different zones of the surface of said catalytic bed which, in the better applications, can reach 60/70° C.; due to this it is accepted that it is not possible for the catalyst to operate according to the predetermined design conditions, thus reducing the reaction yield and increasing the operating costs.

SUMMARY OF THE INVENTION

The technical problem underlying the present invention is that of providing a catalytic secondary reforming process of the type considered, in which a substantially uniform temperature distribution or, at most, one that is variable within a very small range of values about a predetermined design temperature is ensured through time on the catalytic bed, so as to allow the catalyst itself to operate in optimal conditions.

The idea for a solution to such a technical problem is that of realizing, immediately upstream of the first oxidation step provided in said catalytic secondary reforming process, an optimal mixing of the flows comprising hydrocarbons and oxygen, respectively, with continuous formation of a gas flow mixed to such a point as to allow the oxidation reaction to develop uniformly and homogeneously in the whole of the fluid mass.

In other words, by doing this, in the first step of the reforming process of the invention the oxidation reaction of said hydrocarbons takes place with a substantially uniform degree of conversion, consequently obtaining constant temperature and composition in the gases produced by such a reaction at the entry of the catalytic bed.

Based upon said idea, the aforementioned technical problem is solved by a catalytic secondary reforming process of the type considered, characterized in that said step of mixing said gas flows takes place by giving to said at least one of said gas flows a rotating swirling motion about said predetermined feed direction.

Advantageously, said first gas flow comprising hydrocarbons and said second gas flow comprising oxygen are fed into said reactor in said predetermined feed direction, keeping them separate for an initial portion of said reactor of predetermined length, said flows being one inside the other and coaxial, and said mixing step takes place downstream of said portion, giving at least to said inner and coaxial flow a rotating swirling motion about said predetermined feed direction.

Preferably, said gas flow subjected to rotating swirling motion corresponds to said second gas flow comprising oxygen.

The present invention also refers to a catalytic reforming reactor for carrying out the aforementioned process.

Further characteristics and advantages of the invention will become clearer from the detailed description of an embodiment of a catalytic secondary reforming process according to the invention, given hereafter with reference to the attached drawings, given only for indicative and non-limiting purposes.

DETAILED DESCRIPTION

Figure 1:
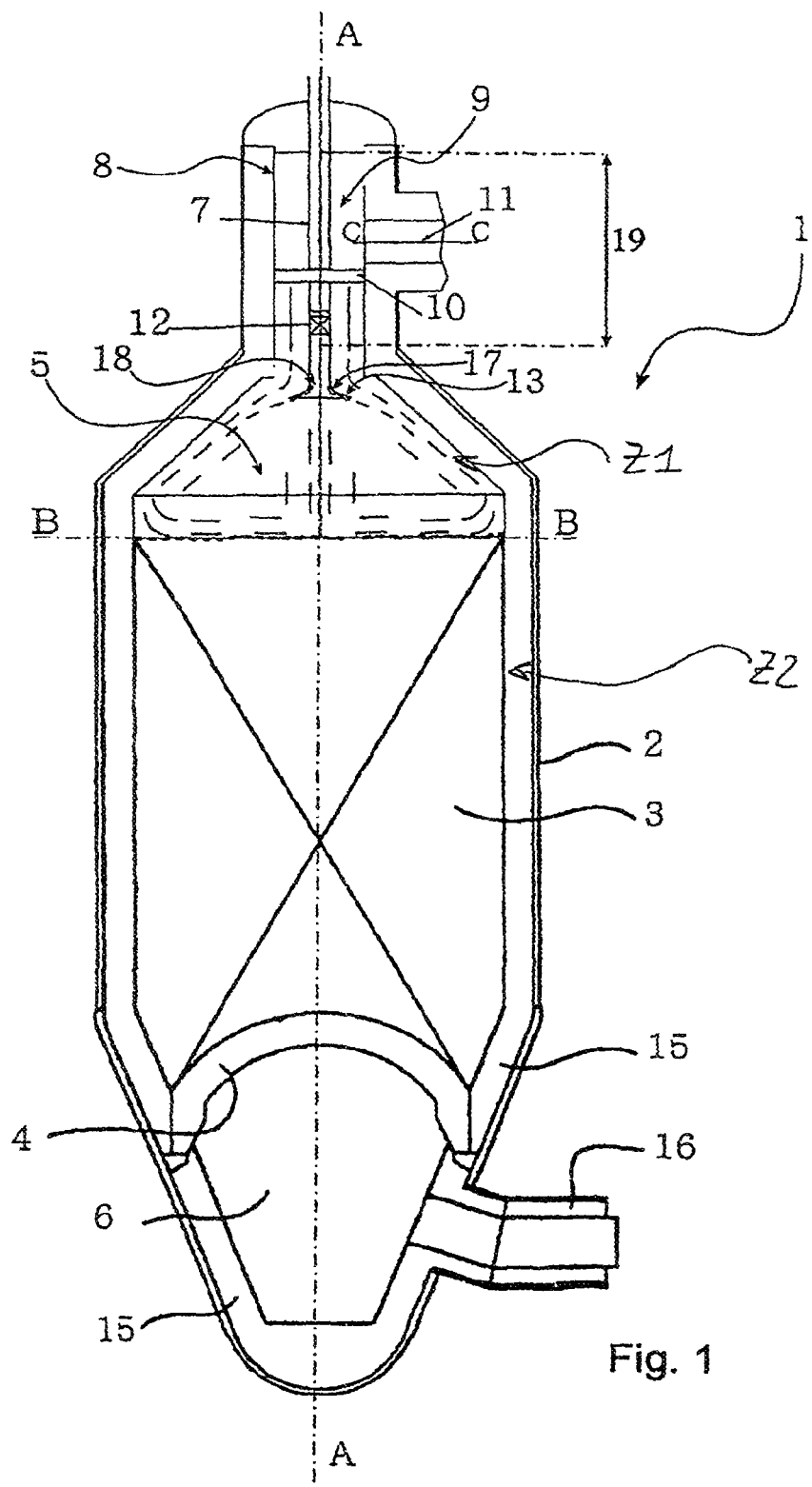
FIG. 1 schematically shows a section view of a reforming reactor for carrying out a process according to the invention.

With reference to FIG. 1, a reactor for carrying out the catalytic secondary reforming process of the present invention is globally indicated with 1.

Such reactor comprises a substantially cylindrical shell 2, with a vertical axis A-A, and having an inner wall coated with refractory material resistant to high temperatures, generally indicated with 15 in FIG. 1. In said reactor a first zone Z1 and a second zone Z2, on top of one another and in fluid communication with each other, are defined. A catalytic bed 3, the upper surface or "free surface" of which constitutes a plane B of separation between said zones, is supported, in a per se known way, in the lower zone Z2.

At the upper and lower ends, having frusto-conical shape, of the shell 2 are respectively defined a reaction chamber 5, in the first zone Z1, defined at the bottom by said plane B (upper surface of the catalytic bed 3), and a collection chamber 6 of the reaction products in fluid communication with the outside thanks to a discharge duct 16.

In accordance with the present invention, the catalytic secondary reforming process comprises the feeding into the reactor 1, with feed direction substantially parallel to the axis A-A thereof, of a first continuous gas flow comprising hydrocarbons and of a second continuous gas flow comprising oxygen. The latter has a feed direction substantially coaxial with respect to the axis A-A of the reactor 1.

In particular, according to a preferred embodiment of the present invention, said gas flows are kept separate from each other for an initial portion 19 of said reactor 1, of predetermined length, for such a purpose using a first duct 8 and a second duct 7, both tubular, rigid, preferably rectilinear, coaxial and concentric. The second duct 7 is arranged inside said first duct 8, and an annular interspace 9 is defined between the two ducts.

Said ducts 7,8 have a predetermined length and in the example extend axially in the zone Z1 which, through them, is in fluid communication with sources (not represented) of said first and second gas flow, outside of the reforming reactor 1. Preferably, said second duct 7 extends axially in the reaction zone 5.

Preferably, the first gas flow crosses said interspace 9, whereas the second gas flow crosses the second duct 7, thus being inside and coaxial to said first gas flow.

The first gas flow, the one comprising hydrocarbons, at the time of introduction in the interspace 9 through the duct 11 with axis C-C generally perpendicular to the axis A-A, is made to pass through a distributor device 10 in order to obtain a uniform speed distribution in the interspace 9.

In accordance with a characteristic of the present invention, the second gas flow, the one comprising oxygen, is given rotary motion about the feed direction, whilst it crosses the respective second duct 7.

Advantageously, said rotary motion is a so-called swirling motion and is obtained through an appropriate so-called swirling device 12, supported in the second duct 7 at a predetermined distance from the end thereof that is open in the zone Z1.

For example, the swirling device 12 is of the type comprising inclined or helical fins, not represented since they are per se known, capable of giving rotary motion to a fluid that crosses them.

When the second gas flow reaches the open end 18 of the second duct 7, precisely due to the rotary motion, it deviates in a substantially radial direction towards the walls of said chamber 5.

In this way, the surface layer of said second flow comes into contact with the first flow which flows coaxially with and outside of said second flow, pushing it outwards towards the walls of the reaction chamber 5 and allowing the mixing of the two flows.

At the time when they come into contact, the first and second flow start to react with each other with partial oxidation of the hydrocarbons of the first flow, and consequent obtainment of a third gaseous flux comprising oxygen and carbon monoxide over a small part of unreacted hydrocarbons.

Thanks to the mentioned configuration and process, inside the reaction chamber 5, an efficacious mixing is achieved, greatly improved by the rotary movement of the second flux, as regards a simple concurrent contact, allowing the obtainment of a uniform degree of advancement of the partial oxidation reaction of the hydrocarbons to give hydrogen and carbon monoxide.

Consequently, a uniform temperature and composition are attained on the surface of the catalytic bed, thus allowing the catalyst to work in the predetermined temperature and composition conditions, advantageously increasing the reaction yield and reducing the operating costs.

The third gas flow is then fed to said catalytic bed 3, where the partial oxidation reaction of said hydrocarbons proceeds.

At the exit of the catalytic bed 3 the reacted gases flow into the collection chamber 6 of the reaction products from the reactor through the discharge duct 16.

Figure 2:
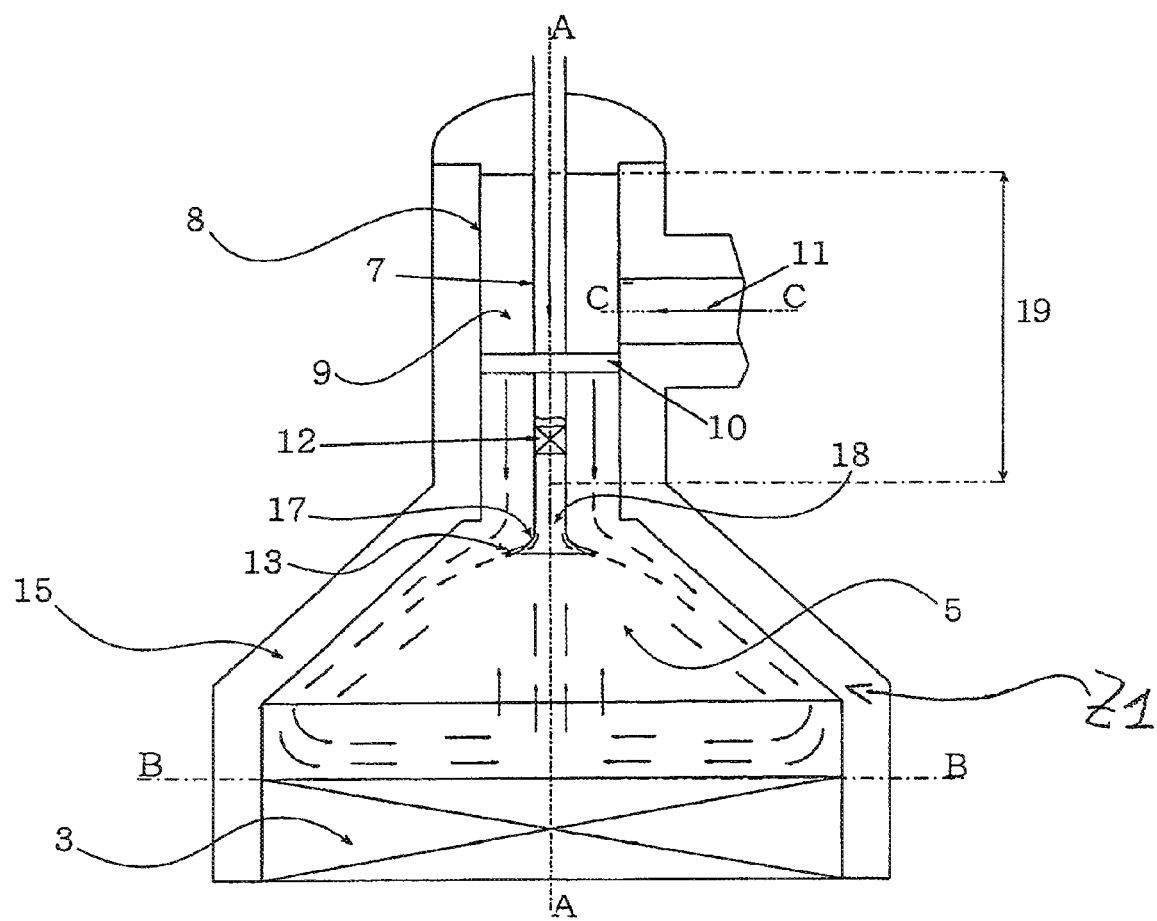
FIG. 2 schematically shows a section view of a detail of FIG. 1.
Figure 3:
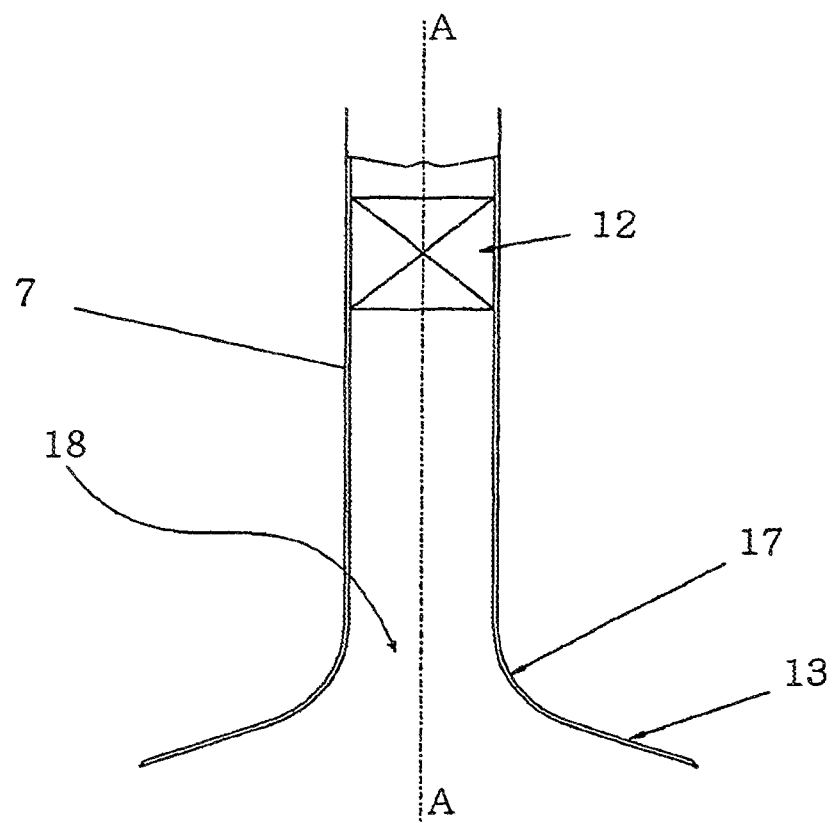
FIG. 3 schematically shows a section view of a detail of FIG. 2.

In the example of FIGS. 1-3, the open end 18 of the second duct 7 diverges towards the walls of said reaction chamber 5.

Advantageously, said open end 18 comprises a frusto-conical shaped section 13, coaxial with the second cylindrical duct 7 and having taper facing towards the center of the second duct 7, with the opening angle at a predetermined size, greater than or equal to 30 and less than or equal to 180, preferably between 120 and 150.

Moreover, such a section is preferably joined to the second duct 7 through a large radius concave fitting 17, with bending radius of between one tenth and five times the diameter of said second duct 7, preferably between 0.1 and 0.2 times the size of the aforementioned diameter.

According to an alternative embodiment, not represented, said open end 18 comprises a concave section 13 with a large radius, with bending radius of between one tenth and five times the diameter of said second duct 7, preferably between 0.1 and 0.2 times the size of the aforementioned diameter.

The second duct 7 with the fitting 17 and/or the section 13 form a particular profile with a distinctive trumpet-like shape.

Due to the configuration of the section 13, the first gas flow, which comprises hydrocarbons and which flows inside the annular interspace 9, is deflected to the outside, following the aforementioned trumpet-like profile and expanding radially towards the frusto-conical walls of the reactor.

The second gas flow, due to the widening and the conical configuration of the passage section of the nozzle and due to its swirling motion, tends to adhere to the curved walls of the fitting 17 and to the conical walls of the section 13. This allows operation at lower speeds, even equal to or less than half the speed required in the case of an inner duct 7 having the end 18 open rectilinear and not divergent, and thus allows to advantageously limit the pressure drops which intervene when rotary motion is given to the aforementioned flow. In this way, said second flow easily moves away from its original direction and also expands outwards, following the aforementioned trumpet-like profile, in the direction of the walls of the reaction zone 5, parallel to the first gas flow comprising hydrocarbons.

The description of the process according to the invention made above has been made with reference-to the preferred case in which the flow comprising oxygen is outside the flow comprising hydrocarbons.

According to yet another embodiment of the present invention, not represented, both the second duct 7 and the interspace 9 are equipped with swirling devices 12 configured in such a way as to give rotary motion to the flows which cross them.

In this case, the swirling devices 12 are shaped so as to give the two gas flows respective rotary motions in opposite directions, i.e. in countercurrent with respect to each other. In such a way, at the moment of contact inside the reaction chamber 5, the mixing of the two flows is further improved.

The invention thus conceived is susceptible to variants and modifications aimed at satisfying contingent and specific requirements all of which fall within the scope of protection of the invention itself, as defined by the following claims.

What is claimed is:

1. A reactor for carrying out a catalytic secondary reforming process, for the production of synthesis gas, comprising:
    a substantially cylindrical shell, with a substantially vertical axis;
    a first zone and a second zone, representatively divided by a plane perpendicular to said axis and in fluid communication with each other;
    a catalytic bed housed in said second zone;
    a reaction chamber in said first zone;
    a cylindrical first duct in fluid communication with said reaction chamber;
    a second cylindrical duct having said substantially vertical axis and an open end, in fluid communication with said reaction chamber,
    wherein said second duct comprises internally a swirling device to give swirling motion to a fluid which crosses it, and
    wherein said second duct is coaxial, concentric and arranged inside said first duct.

2. The reactor according to claim 1, wherein said second cylindrical duct extends inside said reaction chamber.

3. The reactor according to claim 1, wherein said open end of said second cylindrical duct diverges towards the walls of said reaction chamber.

4. The reactor according to claim 3, wherein said open end comprises a frusto-conical shaped section, coaxial with said second cylindrical duct and having taper facing towards the center of the duct, with opening angle at a predetermined size, greater than or equal to 30° and less than or equal to 180°.

5. The reactor according to claim 4, wherein said open end is joined to said second duct through a concave fitting with a bending radius of between one tenth and five times the diameter of said second duct.

6. The reactor according to claim 3, wherein said open end comprises a concave section with a bending radius of between one tenth and five times the diameter of said second duct.

7. The reactor according to claim 1, wherein said first duct comprises, on the inside, a second swirling device for giving swirling motion to a fluid that crosses it.

* * * * *